(12) United States Patent
Jiang et al.

(10) Patent No.: US 12,360,744 B2
(45) Date of Patent: Jul. 15, 2025

(54) GENERAL DESCRIPTION LANGUAGE DATA SYSTEM FOR DIRECTED ACYCLIC GRAPH AUTOMATIC TASK FLOW

(71) Applicant: SHENZHEN JINGTAI TECHNOLOGY CO., LTD., Guangdong (CN)

(72) Inventors: Ziqi Jiang, Guangdong (CN); Shuhao Wen, Guangdong (CN); Liang Tan, Guangdong (CN); Yang Liu, Guangdong (CN); Jian Ma, Guangdong (CN); Shanshan Fan, Guangdong (CN); Lipeng Lai, Guangdong (CN)

(73) Assignee: SHENZHEN JINGTAI TECHNOLOGY CO., LTD., Guangdong (CN)

( * ) Notice: Subject to any disclaimer, the term of this patent is extended or adjusted under 35 U.S.C. 154(b) by 273 days.

(21) Appl. No.: 17/788,300

(22) PCT Filed: Oct. 13, 2020

(86) PCT No.: PCT/CN2020/120660
§ 371 (c)(1),
(2) Date: Jun. 23, 2022

(87) PCT Pub. No.: WO2022/077222
PCT Pub. Date: Apr. 21, 2022

(65) Prior Publication Data
US 2023/0030393 A1    Feb. 2, 2023

(51) Int. Cl.
*G06F 8/30* (2018.01)
*G06F 8/41* (2018.01)
(52) U.S. Cl.
CPC ............. *G06F 8/315* (2013.01); *G06F 8/42* (2013.01)

(58) Field of Classification Search
None
See application file for complete search history.

(56) References Cited

U.S. PATENT DOCUMENTS 5,999,911 A * 12/1999 Berg .................. G06Q 10/10
705/7.26
9,740,538 B1 * 8/2017 Cohen .................. G06F 8/30
(Continued)

FOREIGN PATENT DOCUMENTS

CN    101668047    9/2012
CN    103440553    12/2013
(Continued)

OTHER PUBLICATIONS

Cranmer et al. "Yadage and Packtivity—analysis preservatin using parameterized workflows", 2017, Jornal of Physics: Conference Series, vol. 898. (Year: 2017).*
(Continued)

*Primary Examiner* — Jason D Mitchell
(74) *Attorney, Agent, or Firm* — Muncy, Geissler, Olds & Lowe, P.C.

(57) ABSTRACT

The present invention provides a general description language data system for directed acyclic graph automatic task flow, including: Step definition layer, Workflow definition layer and Template definition layer; The Step definition layer is the description of a single task, for the input and output declarations of each docker image or other executor, comprises name, type, file and parameters. The Workflow definition layer is a workflow composed of one or more Steps, the dependency topology of these Steps needs to be defined, and shared parameters can also be defined. The Template definition layer is based on a Workflow definition layer. The Template definition layer pre-sets the parameters, and supplies the descriptions, checkers or data source definitions of the parameters. The data center of the present invention is (Continued)

used with the task execution tool, and a programming language needs to be used to implement the corresponding tool.

3 Claims, 6 Drawing Sheets

(56) References Cited

U.S. PATENT DOCUMENTS

| | | | | |
|---|---|---|---|---|
| 9,952,899 | B2* | 4/2018 | Novaes | G06Q 10/06 |
| 10,204,311 | B2* | 2/2019 | Standing | G06Q 10/0633 |
| 10,423,393 | B2* | 9/2019 | Lam | G06Q 10/0633 |
| 10,467,050 | B1 | 11/2019 | Schmidgall et al. | |
| 10,474,506 | B1* | 11/2019 | Gray | G06F 9/4498 |
| 2007/0276689 | A1* | 11/2007 | Slone | G06F 3/04817 |
| | | | | 717/109 |
| 2010/0095267 | A1* | 4/2010 | Bouillet | G06F 8/10 |
| | | | | 715/810 |
| 2015/0170088 | A1* | 6/2015 | Rizk | G06Q 10/06316 |
| | | | | 705/7.26 |
| 2015/0220308 | A1* | 8/2015 | Condon | G06F 8/20 |
| | | | | 717/104 |
| 2015/0347935 | A1* | 12/2015 | Standing | H04L 67/10 |
| | | | | 705/7.27 |
| 2015/0370540 | A1* | 12/2015 | Coslovi | G06Q 10/0633 |
| | | | | 717/121 |
| 2017/0083290 | A1* | 3/2017 | Bharthulwar | G06F 8/71 |
| 2017/0315789 | A1* | 11/2017 | Lam | G06Q 10/0633 |
| 2017/0316355 | A1* | 11/2017 | Shrestha | G06Q 10/067 |
| 2020/0057675 | A1* | 2/2020 | Dias | G06F 9/5061 |

FOREIGN PATENT DOCUMENTS

| | | |
|---|---|---|
| CN | 103440553 A | 12/2013 |
| CN | 106326006 | 1/2017 |

OTHER PUBLICATIONS

Lukas Heinrich, "Yadage Documentation", Jun. 24, 2018, <retrieved from https://yadage.readthedocs.io/_/downloads/en/latest/pdf/> (Year: 2018).*

"International Search Report (Form PCT/ISA/210) of PCT/CN2020/120660", mailed on Apr. 9, 2021, with English translation thereof, pp. 1-6.

"Written Opinion of the International Searching Authority (Form PCT/ISA/237) of PCT/CN2020/120660", mailed on Apr. 9, 2021, with English translation thereof, pp. 1-4.

Guangmeng Zhai et al., "PWMDS: A System Supporting Provenance-Based Matching and Discovery of Workflows In Proteomics Data Analysis", 2012 IEEE 16th International Conference on Computer Supported Cooperative Work in Design, May 2012, pp. 456-463.

* cited by examiner

|  | inlineConst | templateConst | workflowConst | stepConst | typeDefConst | inlineValue | templateValue | workflowValue | stepValue | typeDefValue |
| --- | --- | --- | --- | --- | --- | --- | --- | --- | --- | --- |
| inlineConst | crash | crash | crash | crash | crash | override | override | override | override | override |
| templateConst | crash | crash | crash | crash | crash | override | override | override | override | override |
| workflowConst | crash | crash | crash | crash | crash | override | override | override | override | override |
| stepConst | crash | crash | crash | crash | crash | override | override | override | override | override |
| typeDefConst | crash | crash | crash | crash | crash | override | override | override | override | override |
| inlineValue | ignore | crash | crash | crash | crash | crash | override | override | override | override |
| templateValue | ignore | ignore | crash | crash | crash | ignore | crash | override | override | override |
| workflowValue | ignore | ignore | ignore | crash | crash | ignore | ignore | crash | override | override |
| stepValue | ignore | ignore | ignore | ignore | crash | ignore | ignore | ignore | crash | override |
| typeDefValue | ignore | ignore | ignore | ignore | ignore | ignore | ignore | ignore | ignore | crash |

Fig. 2

GENERAL DESCRIPTION LANGUAGE DATA SYSTEM FOR DIRECTED ACYCLIC GRAPH AUTOMATIC TASK FLOW

CROSS-REFERENCE TO RELATED APPLICATION

This application is a 371 of international application of PCT application serial no. PCT/CN2020/120660, filed on Oct. 13, 2020. The entirety of each of the above mentioned patent applications is hereby incorporated by reference herein and made a part of this specification.

TECHNICAL FIELD

The invention pertains to the field of cloud computing, and in particular relates to a general description language data system for directed acyclic graph type automatic task flow.

DESCRIPTION OF RELATED ART

Nowadays, the trend of professional segmentation in the field of scientific computing is obvious. The development of subdivided problem-solving algorithms and the actual value-oriented engineering application have been divided into two development directions. How to combine the use of subdivided professional methods to complete the goal has become an indispensable requirement. The smaller and smaller method granularity also makes the learning cost of a large number of methods and the labor cost of combining them higher and higher, and the automated workflow technology is also widely used in various fields. In the field of scientific computing, the SBP (Seven Bridge Platform) developed by SBG (Seven Bridges Genomics) company in the United States is regarded as the company's core technology. It integrates algorithms, data hosting, and computing resources and constructs a flexible genome data analysis process and performs calculations through a visual interface. In the open source field, there is also a common task flow description language standard CWL (Common Workflow Language), which is mainly for data-intensive scientific computing and uses text format task flow description and command line tools to connect different task executions. Mainstream cloud computing resource providers such as AWS, Google, AliCloud, and computing standards such as HPC and Spark provide support for CWL.

For the task flow description language, there are two core functions which are defining specific tasks and defining the flow between tasks. The input, output and execution methods of tasks are described by defining specific tasks, and the execution order of the tasks and the path of data flow are defined by defining the flow of tasks. These core information is provided to the specific task flow engine for parsing, and the automated execution of the task flow can be completed.

For the closed task flow platform, it lacks openness and ease of use, and can only use the algorithm tasks provided internally for arrangement, which is difficult to meet the rapid development of computing needs and cannot access flexible computing resources, so we are mainly concerned about a general task flow description language.

For the existing general description language, the main defects are as follows.
1. The Granularity of Task Description is Rough.

The granularity of the single task description of the existing general description language is very rough. The user needs to define the input parameter group and the acquisition method, but the language does not involve the type and detailed structure of the data, so that the user needs to have a deep understanding of the specific characteristics of the task when using it. Even if the wrong data type and structure are provided, data checking and verification cannot be provided.
2. The Threshold of Knowledge in the Computer Field is High, and it is Inconvenient for Non-Computer Professionals to Arrangement.

The existing general description language is tightly coupled with computer programming technology and has a large number of underlying details and computer-specific terms. Users need to have certain knowledge in the computer field to write. Therefore it cannot meet the needs of both algorithm writers (computer engineers) and algorithm users (scientists).
3. The Information is Complex and it Lacks Data Reuse.

When the existing general description language is applied to high-performance scientific computing, due to its versatility, a large number of parameters required because of the characteristics of the scientific computing field need to be defined, and the parameters need to be repeatedly input, and there is no data template and data override filling ability.
4. It Lacks Automatic Parallel Source Language.

In the field of scientific computing, parallelism is an indispensable ability due to huge computing requirements. The existing general description language lacks parallel description primitives like map-reduce or scatter-gather, and cannot provide automatic parallelism for single-point tasks.

SUMMARY

Based on this, it is necessary to provide a general description language data system for directed acyclic graph automatic task flow, the system comprises a Step definition layer, a Workflow definition layer and a Template definition layer.

The Step definition layer is the description for a single task. For the input and output declarations of a docker image or other executor, it is necessary to specifically declare the name, type, file, and parameters of each input and output item.

The Workflow definition layer defines a workflow composed of one or more Steps, the dependency topology of these Steps, and shared parameters.

The Template definition layer is based on a Workflow definition layer. The Template definition layer pre-sets the parameters, and supplies the descriptions of the parameters, the checkers of the parameters or the data source definitions of the parameters.

According to the above technical solutions of the present application, data of custom types are defined through the TypeDef definition layer. The TypeDef definition layer supports multiple keywords such as type, required, symbols, value, const, ref, embed_value, etc., and the data description granularity can be therefore improved by expanding the details of the data through these keywords. The Step definition layer describing a single task refers to different TypeDef definition layers in the inputs and outputs declarations to declare its own input and output, so as to achieve a high-precision and complete task description. Thus the problem that the single task description granularity of the existing general description language is very rough is solved.

The specific steps of constructing the Template definition layer are as follows. The values item in the Template definition layer is parsed. The values item will contain data such as "$step2/$in_arg2: {const: 1.0}". The part before the slash of the first field is the Step object name, and the part before the slash of the first field is the input item name. The specific mapping in the Workflow definition layer can be located through these two parameters. In the second field, the first parameter before the colon indicates the property of the data (in this embodiment, the data is a constant), and the latter parameter is specific data. When applying the Template definition layer, the property and data represented by the second parameter overrides the Step name and input item name represented by the first parameter.

The references among all layers are implemented through url. For example, "type: ^typedef/common/version/1.0.0" means that the type of the variable introduces a TypeDef definition layer named "common" with version 1.0.0. The original text of the definition can be obtained by requesting these parameters from the data center.

Preferably, the system also includes a TypeDef definition layer. If users need to use special custom types, they need to write the TypeDef definition layer. The TypeDef definition layer mainly abstracts the definitions of general or complex composite types, which is convenient for reference and management.

The advantage of the above embodiments of the present application is that the required, type, value, const, serizalier, symbols and other keywords in the TypeDef definition layer not only provide type declarations, but also support detailed declarations such as default values, constants, and enumeration values. By matching the input data with these declarations, more refined data check and verification can be achieved.

The present invention also provides a solution for realizing the data reference between the four definition layers.

1. The Step definition layer will only refer to the TypeDef definition layer, which is achieved by filling in the reference url when defining the type of data, such as:
   inputs:
     $in_arg1:
   type: ^typedef/common/jobArgs/version/1.0.0
   This example indicates that the Step definition layer refers to the type definition named jobArgs in the TypeDef definition layer named common.

2. The Workflow definition layer will only refer to the Step definition layer, which is achieved by filling in the url when declaring the run field of the step used, such as:
   steps:
     $step1:
       run: ^step/demo/version/1.0.0
   This example indicates that the Workflow definition layer refers to a Step definition layer named demo with the version 1.0.0.

The Template definition layer will only refer to the Workflow definition layer, which is achieved by filling in the url in the workflow field declared in the metadata, such as:
   workflow: ^workflow/some_workflow/version/1.0.0
   This example indicates that the Template definition layer is applied to the Workflow definition layer named some_workflow.

Correspondingly, the present invention also provides a parse method using the system, which includes the following steps:

In a recursive analysis step, input files and all files that the input files depend on are pulled from a data center to a local user device. The parser recursively traverses each value of each input file. If the value is an external link beginning with ^, then a corresponding file of the link is downloaded through a client of the data center, and this step is repeated for a new file until all dependent links are processed.

In a syntax tree analysis step, since data of various layers of the description language has a priority and coverage relationship, in order to realize the data logic of layer by layer coverage, it is necessary to construct objects and perform data override operation layer by layer from the bottom.

In an object loading step, after the parsing is completed, an object tree will be obtained based on the syntax tree analysis. The root node of the object tree is a Workflow object. The Workflow object contains all involved Step objects through a steps property, and the Step objects contain all involved TypeDefs objects through inputs/outputs properties.

Besides constructing the well-defined object tree and assigning values layer by layer, the second important algorithm of the parser is to perform topological sorting on the Step objects of the Workflow object. The user defines the dependencies among different Step objects, and the topological sorting algorithm can work out the most efficient running solution of the Step objects.

Preferably, the syntax tree analysis is described as follows.

Firstly, a type definition file whose Class is TypeDef is parsed. All TypeDef objects are constructed from contents of the file whose Class is TypeDef and stored in a memory as a key-value mapping.

Secondly, all files whose class is Step are parsed to construct Step objects from the content of the files whose class is Step. The inputs/outputs properties of the Step objects contain several TypeDef objects. A TypeDef object from the TypeDef key-value mapping is used to replace the corresponding TypeDef object in a Step object, and the override operation for the TypeDef object in the said Step object is performed according to the type definition file.

Thirdly, a file whose class is Workflow is parsed to construct a Workflow object from the content of the file whose class is Workflow. A steps property of the Workflow object contains all steps involved which are stored in a mode of StepName: StepObject mapping. All Step objects that the Workflow object depends on are fetched from the StepName: StepObject mapping and stored in the "steps" property of the Workflow object. The values in the Workflow object override the values in the Step objects according to the content of the file whose class is Workflow.

Fourthly, a Template file whose class is Template is parsed, each parameter in the Template file are traversed so as to be indexed to a corresponding inputs/outputs parameter of a Step object in the Workflow object, and the override operation for the Step objects in the Workflow object is performed according to the Template file.

Preferably, the method of the topological sorting algorithm includes the following steps.

In a Step A, a FollowMap is found through a referenced link in "inputs" of each of the Step objects. The FollowMap is a mapping of a list of <depended Step: dependent Step>.

In a Step B, after getting the FollowMap, the FollowMap mapping is inverted to get a LeaderMap, which is a mapping of <stepName: Step list on which this Step depends>.

In a Step C, all the Step objects are traversed. If a Step object has not been checked, LeaderSteps of the Step object are traversed. If a Step object does not have a LeaderStep, it means that the Step object has no dependencies, and it is deemed to have been checked and the "Dis" value of the Step object is set to 1. If a Step object does have a LeaderStep, it means that the Step object is dependent, the "Dis" value of the Step object is the sum of the "Dis" values of the LeaderSteps of the Step object. The concept of Distance, which is abbreviated as "Dis", is introduced. It means the distance of dependency of a Step object with the Step object at the starting point.

In a Step D, running sequence of the Step objects is determined by sorting the "Dis" values of the Step objects.

The topological dependency among the Step objects is declared in the inputs of the Step objects. The core of the recursive idea draws on the topological sorting algorithm of the mathematics. FollowMap and LeaderMap are two forms of adjacency matrix. The Step point at the starting point is determined based on the LeaderMap, and the "Dis" value of the Step object at the starting point is set to 1. The "Dis" value of each Step object at an intermediate point is the sum of the "Dis" values of the Step objects on the dependency path from the Step object at the starting point to the Step object at the intermediate point. By sorting the "Dis" values, we can get the most efficient running sequence. And after a Step object is executed, it is only needed to recursively subtract the "Dis" values of the subsequent Step objects according to the FollowMap to update the running sequence of the current state.

The above embodiments of the present invention solve the problem caused by the need to define a large number of parameters in the scientific computing field and solve the problem of data template and data coverage and filling ability.

The present invention brings the following beneficial effects.

1. The matching of input and output can be achieved by checking whether the type keywords are exactly the same.

2. The "ref" keyword is used to indicate an input item is sourced from a certain output item to realize the type and value of the data (for example, "$arg1: {ref: $step1/$output_list1}" in an example of a Workflow definition layer indicates that the input item "arg1" is linked to the output item named "output_list1" of "step1"). And custom types are supported.

3. The description information can be added through the doc keyword in the TypeAndValueDefine substructure. The doc keyword is only displayed as a comment and is not parsed and calculated. Additional description texts that are not related to calculations can be added through the doc keyword. And specific input detection and data conversion can be provided based on the type information.

4. The decoupling of knowledge of different domains is achieved through the separation of the four layers structure. In the use scenario, professionals in the computer field write TypeDef definition layer. Professionals in the scientific computing field write Step definition layer, write Workflow definition layers with the Step definition layer being referred to. Task operation professionals use the Workflow definition layer in combination, and write Template definition layer based on experiences. Thus knowledge decoupling can be realized. The single task is completely decoupled from workflow arrangement, and there is no need to understand computer-related knowledge and details of specific algorithms of tasks. As long as the types of the inputs and outputs between the task definitions can be matched, the connection of the tasks can be arranged.

5. Automatic concurrency primitives are provided. Specific distribution parameters are declared through the "scatter gather" keyword, the input data list is split into several data groups according to the distribution parameters, multiple subtasks are created and each data group is sent to each subtask for parallel computing. The declaration of scatter-gather automatic concurrent subtasks is supported.

6. The parallel capability provided by automatic concurrent subtasks enables the workflow defined by the description language to be used in multiple scenarios such as computing acceleration, data analysis, and streaming computing. It is no longer limited to a simple description of providing the input and output for calculation. And decoupling of different domains is strengthened. Algorithm experts focus on solving abstract problems for development. The concept of parallel ability in the computer field does not need to be considered. When actual computing problems require batch parallel processing, the description language meets this requirement and expands the use and capabilities of tasks.

7. The data among the four definition layers all have a reference relationship and can be overridden according to priorities of various layers, and different data templates can be used to achieve one-click configuration or default parameter configuration.

The present invention provides a set of language standards, the language provides definitions of all necessary information. Specific task execution also requires the use of an interpreter, a data center and task execution tools, and the corresponding tools need to be implemented using programming languages. The data center needs to be able to store each definition file and index to the corresponding file through the reference link. The interpreter needs to read contents of all the definitions and assign the corresponding data to the structures of the definitions according to the reference link. Task execution tools obtain the complete structured data through the interpreter, and schedule and submit tasks based on the information.

BRIEF DESCRIPTION OF THE DRAWINGS

FIG. 2 is a diagram showing data template coverage of language and parsing behavior table in the data system in an embodiment.

DESCRIPTION OF THE EMBODIMENTS

Embodiment 1

Figure 1:
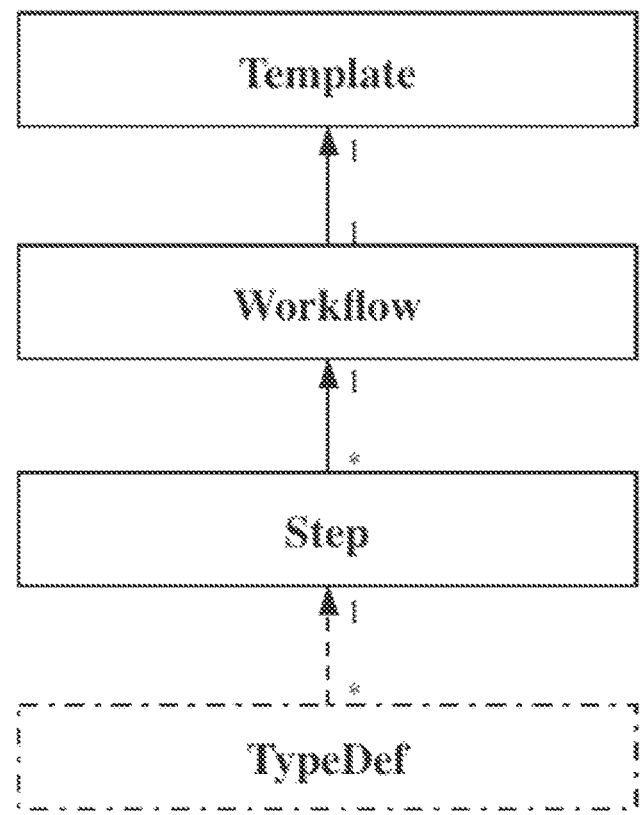
FIG. 1 is a diagram showing the specific hierarchical structure and reference relationship of languages in the data system in an embodiment.

FIG. 1 illustrates the specific hierarchical structure and reference relationship of the languages in the data system. The workflow will be specifically described through four layers which are the TypeDef definition layer, the Step definition layer, the Workflow definition layer and the Template definition layer. The following is an embodiment and introduction of each definition layer.

The TypeDef definition layer is not necessary. If users need to use special custom types, they need to write the TypeDef definition layer. The TypeDef definition layer mainly abstracts the definitions of general or complex composite types for easy reference and management. The Step definition layer is the description for a single task. For the input and output declarations of a docker image or other executor, it is necessary to specifically declare the name, type, file, and parameters of each input and output item. The Workflow definition layer describes a workflow composed of one or more Steps. The dependency topology of these Steps needs to be defined, and shared parameters can also be defined. The Template definition layer is based on a Workflow definition layer. The Template definition layer pre-sets the parameters, and supplies the descriptions of the parameters, the checkers of parameters or the data source definitions of the parameters. A Template definition layer must declare a unique Workflow definition layer. References among the definition layers are implemented through url. For example, "type: ^typedef/common/version/1.0.0" indicates that the type of the variable introduces a TypeDef definition layer named "common" with version 1.0.0.

Embodiment 2

Referring to the example of the following Embodiment 3, "xwlVersion" describes the version of the description language, used to distinguish different versions formed due to the continuous addition of functions. "class" describes the type of this file. There are four types, which are TypeDef, Step, Workflow and Template. "version" describes the version of the definition. "author" describes the author's information. "doc" describes the annotations for the file. "name" describes the name of the file. "author" for the same type of files needs to be kept unique.

A substructure named TypeAndValueDefine is defined in the description language. The substructure contains type, name, value and several properties, which are used to define a variable in detail. The following are three representative examples of TypeAndValueDefine.

```
    First example
    $name:
        type: int[ ]
        const: 1
    value: 1
    ref: $xxx/$xxx
    required: true
    doc: this is a type and value defing demo
    symbols: [1, 2, 3]
        Second example
    $oneDir:
        type: dir
        autoSyncInterval: 300 automatic upload time interval (unit: s)
    autoSyncIgnore: ["run_charm_[0-9]*/", "calc[0-9]*/"]
    Third example
    $oneObject:
        type: object
        serializer: # obj object type needs to define codec
            saveType: file
        fileExt: json
            encoder: ^py:json.dumps
            decoder: ^py:json.loads
```

The specific steps are as follows.

Firstly, the name of the substructure is defined at the outermost layer. The outermost is the name of the substructure, which follows the language principle to start with "$".

Secondly, the general keywords needed to describe the properties of the substructure are defined. The "type" keyword indicates the type, supports the types such as int, double, boolean, string, array, file, dir, dict, record, obj, and can be identified as a list by adding the suffix "[ ]". "const" and "value" are mutually exclusive keywords, indicating the value represented by the definition of the substructure. "value" is a variable value and "const" is an immutable value. "ref" is a keyword mutually exclusive with "value"/ "const" to identify that its value is referenced from another TypeAndValueDefine substructure. The "required" keyword indicates whether the TypeAndValueDefine substructure must have a value. Its default value is true. The "doc" keyword is the description. The "symbols" keyword indicates a range of enumerated values, which is used when the TypeAndValueDefine substructure needs to limit value range.

Thirdly, the special keywords that describe the substructure in a specific type are defined.

In the second example, the substructure is a definition of a type of folder. The "autoSyncInterval" keyword can be defined as the time interval for automatic synchronization The "autoSyncIgnore" keyword indicates a list of file names that is ignored by default, and supports regular syntax.

In the third example, the substructure is a definition of a type of custom object. The "serializer" keyword can be defined as the codec definition required by the object definition "saveType" keyword indicates the storage form, which can be file/string. "fileExt" is the suffix name of the stored file, used when "saveType" is file. The "encoder" keyword indicates an url of the encoder, and the encoder linked to needs to be an executable method that accepts an object and returns string data. The "decoder" keyword indicates an url of the decoder, and the connected decoder needs to be an executable method that accepts a string data and returns an object. The url of the encoder and the url of the decoder follow the external link guideline of using the "^" prefix, and "py:" identifies it is a python method.

Embodiment 3

The following is an example of a TypeDef definition layer named common (the general information part will not be repeated):

```
    xwlVersion: 1.0.0
    class: TypeDef
    doc: a tructure type def
    author: ziqi.jiang
    name: common
    version: 1.0.0
    typeDefs:
        $jobArgs:
            doc: Contains some info about compute args
        type:record
        fields:
            :cores:
                type: int
            :memory:
                type: int
```

The specific steps are as follows.

Firstly, the "typeDefs" keyword is defined at the outermost layer. The "typeDefs" keyword contains some TypeAndValueDefine substructures. For example, the definition declares a "record" type data, and "fields" is a subkey declaration of the "record" type data and contains two properties which are "cores" and "memory".

Secondly, in the TypeAndValueDefine substructure that uses the typeDef definition, it is declared in the "type" keyword through a fixed format link. The following is an example of a TypeAndValueDefine substructure that uses the typeDef definition.

```
    &use_typedef_demo:
        type: ^typedef/commmon/jobArgs/version/1.0.0
```

Embodiment 4

A Step definition layer contains a specific description of a calculation task. The following is an example of a Step definition layer (the general information part has been omitted)

```
entryPoint: ^py:/home/job/run/loader.py
jobArgs:
    type: ^typedef/common/jobArgs/version/1.0.0
    value:
        cores: 16
        memory: 24000
inputs:
    $in_arg1:
        type: file
outputs:
    $out_arg1:
        type: double
```

Firstly, four main keywords describing the properties of the Step definition layer are defined. The four keywords are "entryPoint", "jobArgs", "inputs" and "outputs". "entryPoint" is the execution entry of the Step definition layer. In the example, the "loader.py" file located in the "/home/job/run" directory and executed with python is indicated. "jobArgs" is the execution parameter of the Step definition layer. The referenced TypeDef definition layer is used in the example, and the default values of "24000 MB" and "16" are respectively assigned to the "memory" and "cores" properties of the TypeDef definition layer.

Secondly, the input and output items are defined. "input"/"outputs" are lists of the input and output parameters of the Step definition layer, and there are several TypeAndValueDefine substructures inside.

Embodiment 5

A Workflow definition layer contains several Step declarations and the parameter dependencies among the Step declarations. Here is an example of a Workflow definition layer (the general information part has been omitted).

```
vars:
    $share_arg1:
        type: string
steps:
    $step1:
        run: ^step/demo/version/1.0.0
        jobArgs:
            cores: 2
            memory: 3000
        in:
            $arg1:
                ref: {vars/$share_args1}
        out: [$output_list1, $output2]
    $step2:
        run: ^ step/scatter_gather_demo/version/1.0.0
        scatter
            maxJob: 100
            minJob: 0
            zip:
                $scatter_in_arg1: {ref: $step1/$output_list1}
        jobIn:
            $in_arg1: {ref: zip/$item}
            $in_arg2: ~
        gather:
            failTol: 0.1
            retryLimit: 1
            jobOut: [$output]
            unzip:
                $gather_outputs: {ref: jobOut/$output}
        outputs:
            $out_wf_arg1: {ref: $step2/gather_outputs}
```

The specific steps are as follows.

Firstly, the shared variable pool "vars" that needs to be repeatedly used are defined at the outermost layer. The "vars" keyword defines a group of shared variables applied to the files. If the multiple steps in the workflow definition need to share a group of inputs, it can be referenced by the "ref" keyword. The "steps" keyword declares the Step objects used in the workflow and their dependency topology, and the internal declaration is step name and Step object as a key-value pair.

Secondly, the Step objects used and their topological relationship are defined.

In the example, there are two step declarations named "step1" and "step2" inside the "steps" keyword.

In the declaration of "step1", "run" indicates an url of the specific definition of the step object, which is represented by an external link starting with "A" that follows the guidelines, which means to introduce the definition named "demo" with 1.0.0 version. The "jobArgs" keyword in the declaration of "step1" maps to the "jobArgs" keyword defined in the Step definition, and default values are assigned to the corresponding properties here. The "in" keyword indicates the declared input parameter, and in the example, it is declared that the value of a parameter named "arg1" is referred to the value of "share_arg1" in the shared variable pool "vars". The name of the parameter in the "in" keyword needs to be consistent with the name of the input item in the "input" keyword in the Step definition layer. The "out" keyword indicates a parameter in the workflow, and the name of the parameter in the "out" keyword needs to be consistent with the name of the output item in the "outputs" keyword in the Step definition layer.

In the declaration of "step 2", an automatic concurrent step declared using the scatter-gather primitive is shown. "jobArgs" can be omitted when no default value is assigned. The "scatter" keyword declares that this is a concurrent step.

The "scatter" keyword distributes each element in the received input list to the same number of subtasks as the input list through the zip mapping. In the "scatter" definition, the "maxJob"/"minJob" keywords are the range of the concurrent number of the task. "zip" is concurrent batch parameters mapping of this task. There are several TypeAndValueDefine substructures inside "zip". Since the task definition is oriented to a single input, a parameter mapping needs to be defined to indicate how multiple parameters received are mapped to the input items of the subtasks that need to be concurrent. For example, this example declares an array type named "scatter_in_arg1", which accepts the result of the "output_list1" of the "step1". The "jobIn" keyword is the original input of this step, and there are several TypeAndValueDefine substructures inside. The name must be consistent with the name of input item of the Step definition layer. For example, "in_args1" in the example declares that the value comes from "scatter_in_arg1" in the "zip" mapping. It means that each element in the list received by "scatter_in_arg1" will be distributed to the "in_arg1" item of each subtask when it is running.

The "gather" keyword aggregates the output results of the multiple subtasks into an output list through unzip mapping. In the definition of "gather", "failTol" is the failure tolerance rate of the subtasks, which is a decimal in the range of 0 to 1. If the proportion of failed subtasks is greater than this decimal, the step is considered to have failed and retrying is abandoned. "retryLimit" is the allowed maximum number of failed retries. If some subtasks fail and the proportion of failures is less than the failure tolerance rate, the number of the retries will not exceed the value of "retry Limit". "jobOut" is the output item in the original Step definition layer, and the name needs to be consistent with the output item in the Step definition layer. "unzip" is the mapping of parameter aggregation. For example, in this example, "unzip" declares a definition named "gather_outputs" that aggregates the outputs items of all subtasks.

The "output" keyword at the outermost layer means the final output of the workflow. For example, in this example, an output named "out_wf_arg1" is defined, and its value is sourced from "gather_outputs" which is the aggregate result of "step2".

Embodiment 6

A Template definition layer is used to specify a set of preset values as a data template to be applied to the workflow. The following is an example of a Template definition layer.
workflow: ^workflow/some_workflow/version/1.0.0
values:
   vars/$share_arg1: {value: 233}
   $step2/$in_arg2: {const: 1.0}
The specific steps are as follows.

Firstly, keywords of the target workflow definition layer to which the Template definition layer is applied is defined. The "workflow" keyword indicates the url for the workflow definition to which the Template definition layer is applied.

Secondly, the pre-filled values for the workflow are defined. The "values" keyword is used to set some fixed values that need to be filled, and only support data in the form of value/const. As in the above example, the variable value "233" is assigned to the variable "share_args1" in the shared variable pool "vars", and the immutable value "1.0" is assigned to the "in_arg2" in the input of "step2".

FIG. 2 illustrates the data template coverage of language and parsing behavior table in the data system in an embodiment. Data is divided into "value" (variable value) and "const" (immutable constant) based on its property. Based on the source, the data is divided into five types which are "typedef", "step", "workflow", "template", and "inline". When a Workflow is executed, the final data needs to be parsed from the data sources of the multi definition layers. When a definition has multiple data sources, three behaviors of "ignore", "overwrite", and "conflict" will occur. The parsing of data follows the following principles. "const" data cannot be overrode. The priority of "inline", "template", "workflow", "step" and "typeDef" data decreases in sequence. When two "value" data meet, the override operation is performed based on priority (inline Value can override inlineValue). Two "const" data will conflict. The "value" data of a higher layer and the "const" data of a lower layer will conflict.

Figure 3:
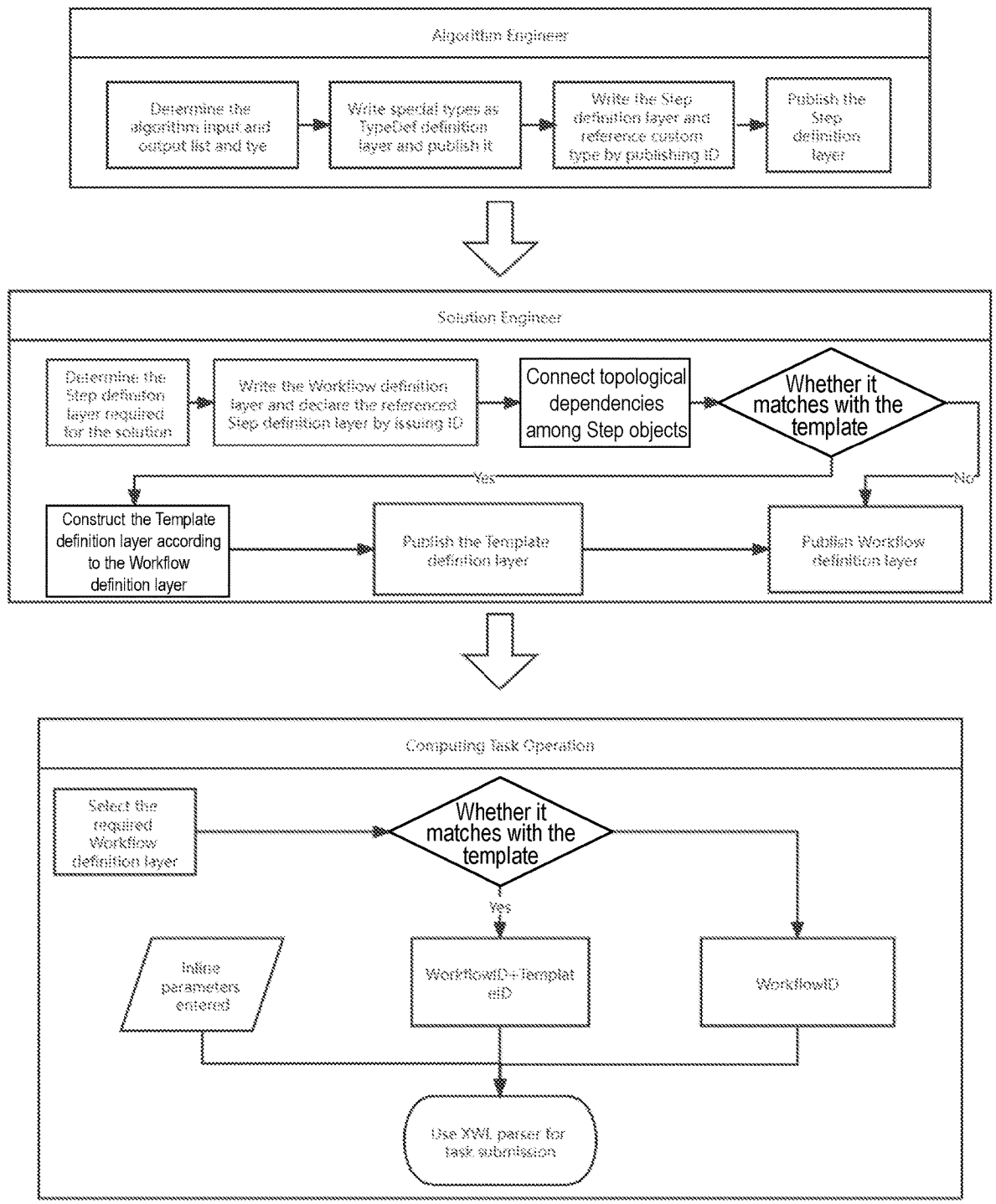
FIG. 3 is a diagram showing the specific use process of the language in the data system in an embodiment.

FIG. 3 illustrates the specific usage process of the language. When using the language, computer engineers need to write the description of the existing algorithm through the Step definition layer of the language. First, customized TypeDef definition layers that may be needed are written according to the existing algorithm requirements and published to the data center. Then the Step definition layers describing the existing algorithms are written and published. If a Step definition layer needs to use a customized TypeDef definition layer, the customized TypeDef definition layer is referred to through "url". Scientific computing solution experts write the Workflow definition layer. In a Workflow definition layer, the required Step definition layers are referred to through "url", and the output of each Step object is linked to the input of the next Step object one by one in the Workflow definition layer. Finally, the Template definition layer is written to fill in the default values of the specific usage scheme. The task performer only needs to select the corresponding Workflow definition layer and Template definition. The Workflow definition layer and Template definition layer are passed to the language interpreter. The language interpreter will parse the definitions layer by layer from top to bottom and obtain the corresponding data from the data center through the referenced "url" for parsing. Finally, the parsed complete data is passed to the task execution tool for task submission.

Embodiment 7

Figure 4:
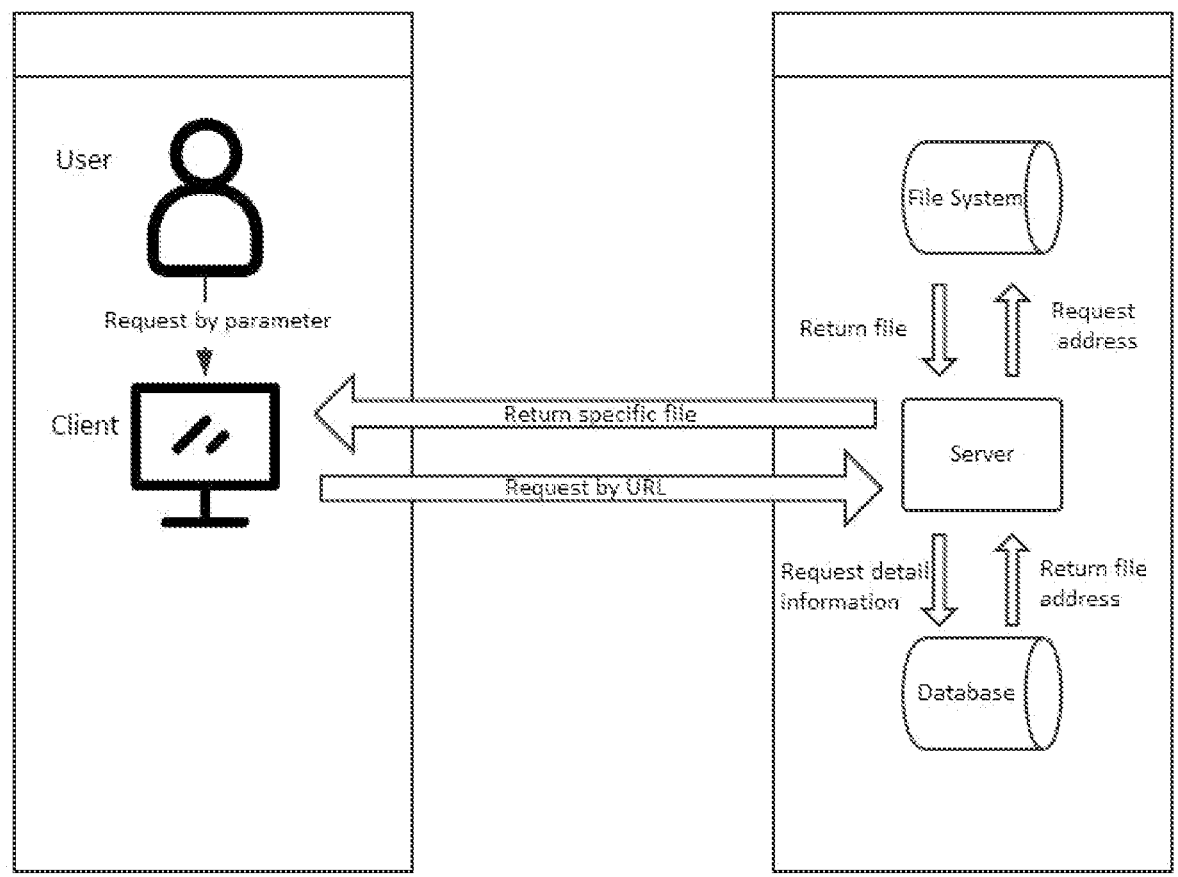
FIG. 4 is a diagram showing the workflow of uploading and downloading in the data center in an embodiment.

The specific process of publishing Step definition layer is as follows.
Data Center:
The data center has a simple C/S architecture, which manages the indexing through a server-side database and manages specific data content through a server-side file system. The client performs simple parsing, uploading, and downloading. FIG. 4 shows the workflow of uploading and downloading in the data center.
Uploading Workflow:
The client receives a description language file from a user device. The client reads the content of the file, obtains the values of type, name, and version parameters by analyzing the "class", "name", and "version" keywords, then sends a request with the content of the file to the server. The server indexes the database through the corresponding parameters. If a file with the same values as the values of type, name, and version parameters already exists, the parameter check failure will be returned. If a file with the same values as the values of type, name, and version parameters does not exist, a new file address is generated, and the detailed information is added to the database. Then the server accesses the file system to store the file in the new file address, and then returns the result to the client.
Downloading Workflow:
The user device carries the type, name, and version parameters to access the server. The server indexes the database through the corresponding parameters, and returns a NotFound error if a corresponding file does not exist. If a corresponding file exists, the server obtains the specific file address, accesses the file system through the file address and obtains the file content, and returns the result to the client.

Figure 5:
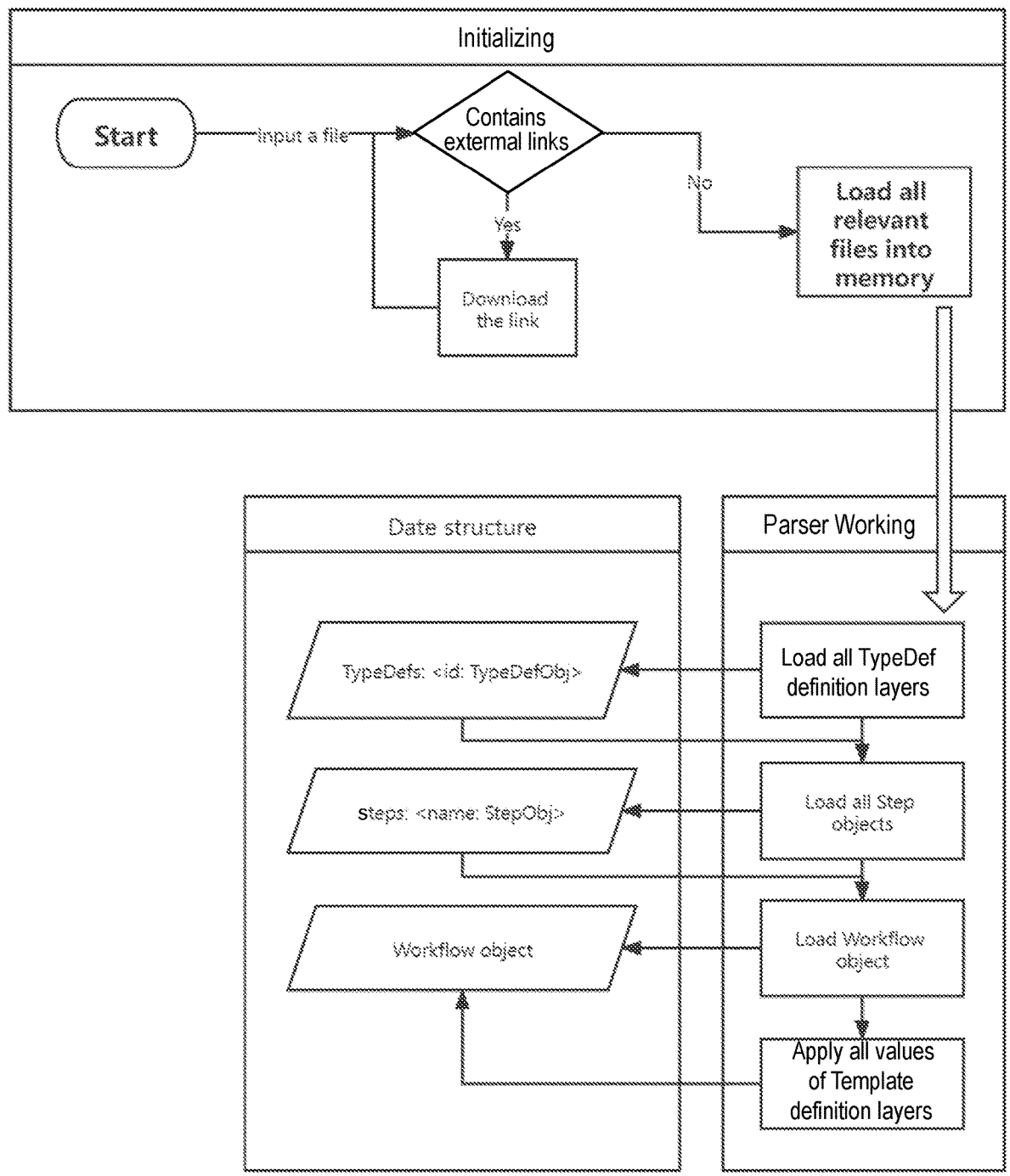
FIG. 5 is a diagram showing the main parsing process in an embodiment.

The advantage of the above scheme is that using the file system to store description language files instead of directly storing them in the database not only preserves the original granularity of the data, but also ensures the integrity of the description language files. Using the file system to store larger description language files also improve the performance of the database. When requesting files in batches, the file addresses can be indexed faster and multi-threading can be used to speed up file reading.
Parser:
The parser is an independent and offline data analysis tool. The complete definition parsing is performed mainly through recursive analysis, syntax tree analysis, object loading, application linking, and application of values layer by layer and so on. FIG. 5 shows the main parsing process.

Before parsing the content, the parser first pulls the input files and all files that the input files depend on from the data center to the local user device. The parser recursively traverses each value of each input file. If the value is an external link beginning with ^, then one of all files that the input files depend on is correspondingly downloaded through the client of the data center, and this step will be repeated for a new file until all dependent links are processed.

Since data of various layers of the description language has a priority and coverage relationship, in order to realize the data logic of layer by layer coverage, it is necessary to construct objects and perform data override operation layer by layer from the bottom. Firstly, a type definition file whose Class is TypeDef is parsed. All TypeDef objects are constructed from the contents of the file and stored in a memory as a key-value mapping.

Secondly, all files whose class is Step are parsed. The Step objects are constructed from the content of the files. The inputs/outputs properties of the Step objects contain several TypeDef objects. If a Step object applies a variable of a custom type, a corresponding object is taken from the TypeDef key-value mapping to replace the TypeDef object in the Step object and the value override operation is performed.

Thirdly, the file whose class is Workflow is parsed, and the Workflow object is constructed from the content of the file. The "steps" property of the Workflow object contains all the Steps involved which are stored in the form of StepName: StepObject mapping. All Step objects that the Workflow object depends on are fetched from the StepName: StepObject mapping and stored in the "steps" property of the Workflow object. The values in the Workflow definition overrides the values in the Step objects according to the content of the file.

Finally, the Template file is parsed, the specific variables and values in the Template file are traversed to be indexed to a corresponding input or output parameter of a corresponding Step object in the Workflow object for override operation.

After the parsing is completed, an object tree will be obtained. The workflow object is the root node. The workflow object contains all the Step objects through the "steps" property and the Step objects contain all the TypeDefs objects through the "inputs"/"outputs" properties.

Figure 6:
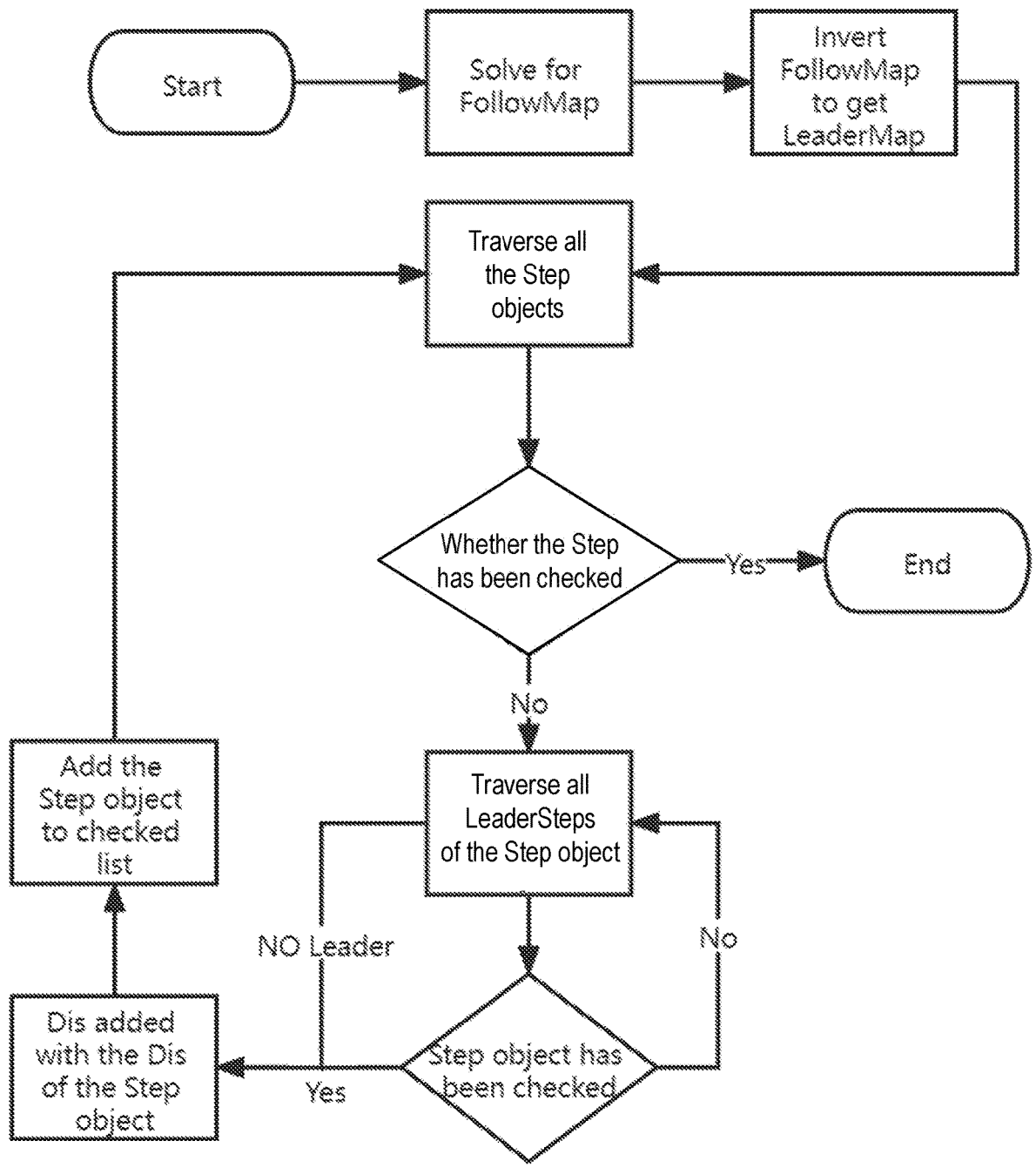
FIG. 6 is a diagram showing the main idea of the topological sorting algorithm in an embodiment.

Besides constructing the well-defined object tree and assigning values layer by layer, the second important algorithm of the parser is to perform topological sorting on the Step objects of the Workflow object. The user defines the dependencies among different Step objects, and the topological sorting algorithm can work out the most efficient operation solution of the Step objects. FIG. 6 shows the main idea of the topological sorting algorithm.

A FollowMap is found through the referenced link in the "inputs" of each Step object. The FollowMap is a mapping of the list of <depended Step: dependent Step>.

After getting the FollowMap, the FollowMap mapping is inverted to get the LeaderMap, which is the mapping of <stepName: Step list on which this Step depends>.

The concept of Distance, which is abbreviated as "Dis", is introduced. It means the distance of dependence of a Step object with the Step object at the starting point. The default "Dis" value of the Step object at the starting point is 1, which means that the step object can be run directly.

All the Step objects are traversed. If a Step object has not been checked, the LeaderSteps of the Step object are traversed. If a Step object does not have a LeaderStep, it means that the Step object has no dependencies, and it is deemed to have been checked and the "Dis" value of the Step object is set to 1. If a Step object does have a LeaderStep, it means that the Step object is dependent, the "Dis" value of the Step object is the sum of the "Dis" values of its LeaderSteps.

The core of the recursive idea draws on the topological sorting algorithm of the mathematics. FollowMap and LeaderMap are two forms of adjacency matrix. The Step object at the starting point is determined based on the LeaderMap, and the "Dis" value of the Step object at the starting point is set to 1. The "Dis" value of each Step object at an intermediate point is the sum of the "Dis" values of the Step objects on the dependency path from the Step object at the starting point to the Step object at the intermediate point. By sorting the "Dis" values, we can get the most efficient running sequence. And after a Step is executed, it is only needed to recursively subtract the "Dis" values of the subsequent Step objects according to the FollowMap to update the running sequence of the current state.

Taking the above-mentioned ideal embodiments based on this application as enlightenment, relevant staff can make various changes and modifications based on the above description, without departing from the scope of the technical idea of this application. The technical scope of this application is not limited to the content in the description, and its technical scope must be determined according to the scope of the claims.

What is claimed is:

1. A parse method using a general description language data system for directed acyclic graph automatic task flow, the method comprising the following steps:
   recursive analysis, comprising:
      pulling input files and all files that the input files depend on from a data center to a local user device; wherein said pulling comprises:
         a parser recursively traversing each value of each of the input files, and
         if the value is an external link beginning with ^, the link indicates one of the all files that the input files depend on which is correspondingly downloaded through a client of the data center, and this step is repeated for the indicated file until all links are processed;
      wherein the input files and all files that the input files depend on are description language files with a class property of TypeDef, Step, Workflow or Template; wherein a file whose class is Type Def abstracts a definition of a custom type; wherein a file whose class is Step is a description of a single task and contains inputs/outputs properties including name, type, file and parameters; wherein a file whose class is Workflow defines a workflow composed of one or more steps with shared parameters and a dependency topology of the defined steps; wherein a file whose class is Template specifies a set of pre-set values for parameters for a workflow and supplies descriptions, checkers or data source definitions of the parameters; and
   syntax tree analysis, comprising:
      a first step, comprising:
         parsing a type definition file whose Class is Type Def to construct one or more Type Def objects from contents of the type definition file; and
         storing the one or more TypeDef objects in a memory as a key-value mapping;

a second step, comprising:
   parsing all files whose class is Step to construct Step objects from content of the files whose class is Step, wherein if the file whose class is Step applies a custom type to one or more of the inputs/outputs properties of the said Step objects;
   using the a Type Def object from a key-value mapping corresponding to the custom type to replace the Type Def object contained in the said Step object; assigning default values specified in the file corresponding to the said Step object to corresponding properties of the Type Def object from the key-value mapping;
   storing the Step objects as a StepName: StepObject mapping;
a third step, comprising:
   parsing a file whose class is Workflow to construct a Workflow object from content of the file whose class is Workflow, wherein a steps property of the Workflow object contains all Step objects involved in the workflow defined by the file whose class is Workflow;
   using corresponding Step objects from the StepName: StepObject mapping to replace the Step objects in the steps property of the Workflow object; assigning default values specified in the file whose class is Workflow to corresponding properties of the Step objects from the StepName: StepObject mapping; and
a fourth step, comprising:
   parsing a Template file whose class is Template;
   traversing each parameter in the Template file so as to index the traversed parameter to a corresponding inputs/outputs parameter of a Step object in the Workflow object; and
   overriding the corresponding Step object in the Workflow object according to the Template file;
topological sorting, comprising:
   the parser topologically sorting the Step objects of the Workflow object, comprising:
      for each of the Step objects, finding a FollowMap through an external link referenced in an inputs parameter of each of the Step objects, wherein the Follow Map is a mapping of a list of <depended Step: dependent Step>;
      after getting the FollowMap, inverting the mapping of the FollowMap to get a LeaderMap, which is a mapping of <stepName: list of LeaderSteps on which this Step depends>;
      traversing all the Step objects, if a Step object has not been checked, traversing LeaderSteps of the Step object;
      if a Step object does not have a LeaderStep, which means that the Step object has no dependencies, and the Step object is deemed to have been checked, setting a "Dis" value of the Step object to 1;
      if a Step object does have a LeaderStep, which means that the Step object is dependent on the LeaderStep, a "Dis" value of the Step object is set to the sum of the "Dis" values of the LeaderSteps of the Step object; and
      determining a running sequence of the Step objects by sorting the "Dis" values of the Step objects; and
object loading, comprising:
   obtaining an object tree based on the syntax tree analysis, wherein the Workflow object is a root node of the object tree, the Workflow object contains all the Step objects through the steps property, and the Step objects contain all the TypeDef objects through the inputs/outputs properties, and loading the Workflow, Step and Type Def objects into a task execution tool.

2. The method according to claim 1, wherein the data center has a C/S architecture with a server and the client, wherein the datacenter manages a data index through a server-side database, and manages specific data content through a server-side file system; and
   the client of the data center performs parsing, uploading, and downloading;
      wherein said uploading comprises:
         the client receiving a description language file from the user device,
         the client reading content of the description language file, obtaining values of type, name, and version parameters by analyzing class, name, and version fields of the description language file, then sends the content of the file to the server so that the server,
            in the case that a file with the type, name and version parameters does not exist on the server, accesses the file system to store the description language file in a new file address and adds the new file address to the data index;
      wherein said downloading comprises:
         the user device sending type, name, and version parameters to the server through the client so that the server indexes the database through the type, name, and version parameters to, in the case that a corresponding description language file exists, obtain a corresponding file address, accesses the file system to obtain a corresponding description language file through the file address, and return the corresponding file to the client;
      wherein the description language file is one of the description language files with a class property of Type Def, Step, Workflow or Template.

3. The method according to claim 2, wherein, in said uploading, the server returns a parameter check failure to the client in the case that a file with same values of type, name, and version parameters already exists.

* * * * *